Patented Aug. 9, 1949

2,478,388

UNITED STATES PATENT OFFICE 2,478,388

β-LACTONES FROM UNSATURATED ALDEHYDES AND UNSATURATED KETONES

Hugh J. Hagemeyer, Jr., Kingsport, Tenn., assignor to Eastman Kodak Company, Rochester, N. Y., a corporation of New Jersey No Drawing. Application September 28, 1945, Serial No. 619,247

10 Claims. (Cl. 260—344)

This invention relates to the preparation of lactones from unsaturated aldehydes and from unsaturated ketones.

Staudinger found that β-lactones were formed when aldehydes or ketones (saturated or unsaturated) were acted upon with diphenyl ketene. Ann. 380, 243 (1911); 384 38–135 (1911) and 401, 263 (1913). Ketene ($CH_2=C=O$) does not undergo a similar reaction.

Kung has shown that ketene reacts with saturated aldehydes or saturated ketones in the presence of a Friedel-Crafts type of catalyst to give β-lactones. See United States Patent 2,356,459, dated August 22, 1944.

Contrasted with this Hopff and Rapp have reported that unsaturated ketones, such as vinyl methyl ketone, react with ketene to give δ- rather than β-lactones. See United States Patent 2,265,165, dated March 8, 1939.

I have now found that unsaturated aldehydes and ketones of the type of acrolein, α-methacrolein, crotonaldehyde, methyl vinyl ketone, methyl isopropenyl ketone, etc. react with ketene in the presence of certain catalysts, to give predominately β- rather than δ-lactones. It is accordingly an object of my invention to provide a process for preparing β-lactones. Another object is to provide new β-lactones. Still other objects will become apparent hereinafter.

In accordance with my invention I prepare β-lactones by reacting ketene ($CH_2=C=O$) and an unsaturated carbonyl compound selected from those represented by the following general formula:

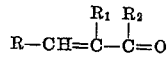

wherein R, $R_1$ and $R_2$ each represents a member selected from the group consisting of a hydrogen atom, an alkyl group, (i. e. an alcohol radical) e. g. methyl, ethyl, n-propyl, isopropyl, benzyl, etc., or an aryl group, e. g. phenyl, p-methoxyphenyl, p-chlorophenyl, etc., in the presence of a catalyst of the Friedel-Crafts type.

The β-lactones produced by my process can be represented by the following general formula:

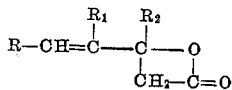

wherein R, $R_1$ and $R_2$ have the values set forth above.

Typical of the unsaturated aldehydes and unsaturated ketones formulated above are: acrolein, α-methacrolein, α-ethacrolein, crotonaldehyde, tiglic aldehyde, cinnamic aldehyde, methyl vinyl ketone, methyl isopropenyl ketone, benzlyidine acetone, β-ethyl-α-methacrolein, 2-hexene-1-al, methyl γ-phenylpropenyl ketone, etc.

Typical catalysts of the Friedel-Crafts type are: halides of boron, zinc, aluminum, tin, titanium, and iron or complexes of these halides with organic compounds, such as ethyl ether, ethyl chloride or the like. All such halides and their complexes are known to the art to catalyze the well-known Friedel-Crafts type reaction.

The amount of catalyst which is employed may be varied. Usually a quantity of the catalyst of from 0.1 to 0.5 g. per mole of unsaturated carbonyl compound is sufficient, although greater quantities can be used.

Generally speaking, because of the great reactivity of ketene and the unsaturated carbonyl compounds and their tendency to polymerize, and because of the relative instability of the β-lactones it is advantageous to carry out the reactions under mild conditions. This can be accomplished by using a solvent or diluent and low temperatures. The solvent should be inert to the ketene and capable of dissolving both the unsaturated carbonyl compound and the β-lactone. Suitable solvents are: ethers of the formula ($C_nH_{2n+1}$)$_2$O wherein n represents a positive integer which are liquid at the reaction temperature (e.g. diethyl ether, diisopropyl ether, isopropyl ethyl ether, di-n-propyl ether, diisobutyl ether, etc.) 1,4-dioxane, chlorinated hydrocarbons (e. g. ethylene dichloride, carbon tetrachloride, etc.).

Temperatures below 50° C. are advantageously employed and with the more active catalysts, such as boron trifluoride-etherate, temperatures as low as —70° C. can be used.

The ketene and unsaturated carbonyl compound are advantageously employed in equimolecular proportions, although an excess of either can be employed. The ketene and unsaturated carbonyl compound are advantageously added simultaneously to the catalyst.

The following examples will serve to illustrate further the manner of practicing my invention:

*Example 1.—β-Lactone of 3-hydroxy-4-methyl-4-pentenoic acid*

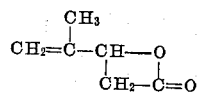

70 g. of α-methacrolein were added dropwise to a solution of 2 cc. of boron trifluoride-etherate catalyst in 500 cc. of diisopropyl ether at 0 to 10° C., while passing into the solution 1.5 gram-moles of ketene through a hollow high-speed stirrer which served to vigorously agitate the solution. After the α-methacrolein and ketene were added, the catalyst was neutralized with anhydrous sodium acetate. The neutral mixture was distilled under reduced pressure and 43 g. of the above formulated β-lactone, boiling at 64° C. at 10 mm. of Hg pressure were obtained.

*Example 2.—Pyrolysis of the β-lactone of 3-hydroxy-4-methyl-4-pentenoic acid*

200 g. of α-methacrolein were added dropwise to a solution of 2 g. of a zinc chloride in 400 cc. of diisopropyl ether at 0° C., while passing into the solution 1.5 gram-moles of ketene. After the addition of the α-methacrolein and ketene, the catalyst was neutralized with anhydrous sodium acetate and the neutral solution was distilled at atmospheric pressure. The β-lactone decomposed during the distillation yielding carbon dioxide and 24 cc. of isoprene boiling at 35° C.

*Example 3.— β - Lactone of 3 - hydroxy - 3,4 - dimethyl-4-pentenoic acid and pyrolysis thereof*

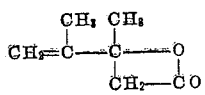

100 g. of methyl isopropenyl ketone were added dropwise to 300 cc. of diisopropyl ether containing 2 cc. of boron trifluoride-etherate at 0–10° C., while passing into the solution 1.5 gram-moles of ketene. After the methyl isopropenyl ketone and ketene had been added, the catalyst was neutralized with sodium acetate, and the diisopropyl ether and diketene were removed by distillation at low temperature under reduced pressure. The residue consisted essentially of the above formulated β-lactone. The residue was subjected to destructive distillation and 23 g. of 2,3-dimethylbutadiene were obtained. B. P.$_{740}$ 68° C. $n_D^{20}$ 1.4379. This quantity of 2,3-dimethylbutadiene represented a 28 per cent conversion of methyl isopropenyl ketone to 2,3-dimethylbutadiene.

*Example 4.—β-Lactone of 3-hydroxy-4-hexenoic acid and pyrolysis thereof*

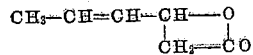

200 g. of crotonaldehyde were added dropwise to 2 cc. of boron trifluoride-etherate dissolved in 400 cc. of diisopropyl ether, at —40° C., while 2 gram-moles of ketene were passed into the solution through a hollow high-speed stirrer which served to agitate the solution vigorously. After the crotonaldehyde and ketene had been added, the catalyst was neutralized with anhydrous sodium acetate and the neutral solution distilled at 40 mm. of Hg pressure to remove the diisopropyl ether and unchanged crotonaldehyde. The residue consisted essentially of the above formulated β-lactone together with a small amount of the δ-lactone of the following formula:

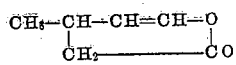

Destructive distillation of the aforesaid residue gave 6 g. of isoprene (B. P.$_{740}$ 35° C.) and 42 g. of piperylene (B. P.$_{740}$ 41.4° C.). This corresponded to 5 per cent conversion of the crotonaldehyde to the δ-lactone and a 35 per cent conversion to the β-lactone.

*Example 5.—β-Lactone of 3-hydroxy-4-hexenoic acid and pyrolysis thereof*

200 g. of crotonaldehyde were added dropwise to a solution of 1 g. of zinc chloride in 300 cc. of diisopropyl ether at 0° C. While passing into the solution 2 gram-moles of ketene and vigorously agitating the solution. After the addition of crotonaldehyde and ketene the catalyst was neutralized with a little sodium bicarbonate. The diisopropyl ether and unchanged crotonaldehyde were removed at 40 mm. of Hg pressure. The residue consisted essentially of the β-lactone. Distillation of the residue at atmospheric pressure gave 42 g. of piperylene, boiling at 41.4° C. at 740 mm. of Hg pressure.

In a manner similar to that shown in the foregoing examples, the β-lactone of 4-ethyl-3-hydroxy-4-pentenoic acid can be made from α-ethacrolein; the β-lactone of 3-hydroxy-4-methyl-4-hexenoic acid can be made from tiglic aldehyde; the β-lactone of 3-hydroxy-5-phenyl-4-pentenoic acid can be made from cinnamic aldehyde; the β-lactone of 3-hydroxy-4-methyl-4-heptenoic acid can be made from β-ethyl-α-methacrolein; the β-lactone of 3-hydroxy-3-octenoic acid can be made from 2-hexene-1-al; the β-lactone of 3-hydroxy-3-methyl-4-pentenoic acid can be made from methyl vinyl ketone; the β-lactone 3-hydroxy-3-methyl-5-phenyl-4-pentenoic acid can be made from benzylidene acetone and the β-lactone of 3-hydroxy-3-methyl-6-phenyl-4-hexenoic acid can be made from methyl γ-phenyl-propenyl ketone.

What I claim as my invention and desire to be secured by Letters Patent of the United States is:

1. The β-lactones represented by the following general formula:

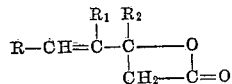

wherein R, R$_1$ and R$_2$ each represents a member selected from the group consisting of a hydrogen atom, an alkyl group and an aryl group.

2. A process for preparing a β-lactone comprising reacting at a temperature below 50° C., ketene (CH$_2$=C=O) with an unsaturated carbonyl compound selected from those represented by the following general formula:

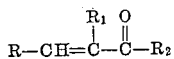

wherein R, R$_1$ and R$_2$ each represents a member selected from the group consisting of a hydrogen atom, an alkyl group and an aryl group, in the presence of a Friedel-Crafts type of catalyst and then neutralizing the catalyst while the temperature is still below 50° C.

3. A process for preparing a β-lactone comprising reacting, at a temperature below 50° C., ketene (CH$_2$=C=O) with an unsaturated aldehyde selected from those represented by the following general formula:

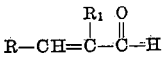

wherein R and R$_1$ each represents a member selected from the group consisting of a hydrogen atom, an alkyl group and an aryl group, in the presence of a Friedel-Crafts type of catalyst and then neutralizing the catalyst while the temperature is still below 50° C.

4. A process for preparing a β-lactone comprising reacting, at a temperature below 50° C., ketene (CH₂=C=O) with an unsaturated ketone selected from those represented by the following formula:

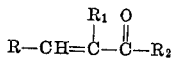

wherein R and R₁ each represents a member selected from the group consisting of a hydrogen atom, an alkyl group and an aryl group, and R₂ represents a member selected from the group consisting of an alkyl group and an aryl group, in the presence of a Friedel-Crafts type of catalyst, and then neutralizing the catalyst while the temperature is still below 50° C.

5. A process for preparing a β-lactone comprising reacting, at a temperature below 50° C., ketene (CH₂=C=O) with an unsaturated carbonyl compound selected from those represented by the following general formula:

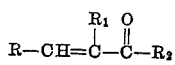

wherein R, R₁ and R₂ each represent a member selected from the group consisting of a hydrogen atom, an alkyl group and an aryl group, in the presence of a Friedel-Crafts type of catalyst, in a liquid solvent for the unsaturated carbonyl compound and for the β-lactone, said solvent being inert to ketene at the reaction temperature, and then neutralizing the catalyst while the temperature is still below 50° C.

6. The β-lactones represented by the following general formula:

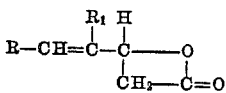

wherein R and R₁ each represents a member selected from the group consisting of a hydrogen atom, an alkyl group and an aryl group.

7. The β-lactone represented by the following formula:

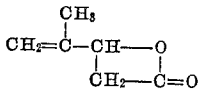

8. The β-lactone represented by the following formula:

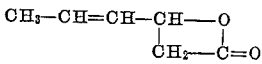

9. The β-lactones represented by the following general formula:

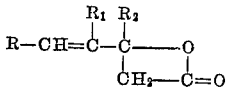

wherein R and R₁ each represents a member selected from the group consisting of a hydrogen atom, an alkyl group and an aryl group, and R₂ represents a member selected from the group consisting of an alkyl and an aryl group.

10. The β-lactone represented by the following formula:

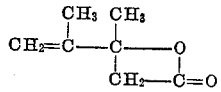

HUGH J. HAGEMEYER, Jr.

REFERENCES CITED

The following references are of record in the file of this patent:

UNITED STATES PATENTS

| Number | Name | Date |
|---|---|---|
| 2,265,165 | Hopff et al. | Dec. 9, 1941 |
| 2,356,459 | Kung | Aug. 22, 1944 |
| 2,361,036 | Kung | Oct. 24, 1944 |
| 2,382,464 | Boese | Aug. 14, 1945 |
| 2,424,589 | Steadman | July 29, 1947 |
| 2,424,590 | Steadman et al. | July 29, 1947 |